US012760885B2

(12) United States Patent
Collison

(10) Patent No.: US 12,760,885 B2
(45) Date of Patent: Oct. 13, 2026

(54) DOUBLE SEAL, TWO-PIECE, WATERPROOF LIGHT

(71) Applicant: NCP Industries LLC, Norfolk, NE (US)

(72) Inventor: Ryan Collison, Pierce, NE (US)

(73) Assignee: NCP Industries LLC, Norfolk, NE (US)

(*) Notice: Subject to any disclaimer, the term of this patent is extended or adjusted under 35 U.S.C. 154(b) by 0 days.

(21) Appl. No.: 19/374,545

(22) Filed: Oct. 30, 2025

(65) Prior Publication Data

US 2026/0132917 A1 May 14, 2026

Related U.S. Application Data

(60) Provisional application No. 63/718,197, filed on Nov. 8, 2024.

(51) Int. Cl.
*F21V 31/00* (2006.01)
*F21S 8/02* (2006.01)
*F21V 15/01* (2006.01)
*F21V 21/04* (2006.01)
*F21V 23/00* (2015.01)
*F21Y 101/00* (2016.01)
*F21Y 115/10* (2016.01)

(52) U.S. Cl.
CPC ............ *F21V 31/005* (2013.01); *F21S 8/026* (2013.01); *F21V 15/01* (2013.01); *F21V 21/049* (2013.01); *F21V 23/002* (2013.01); *F21Y 2101/00* (2013.01); *F21Y 2115/10* (2016.08)

(58) Field of Classification Search
CPC ...... F21V 31/005; F21V 15/01; F21V 21/049; F21V 23/002; F21S 8/026
See application file for complete search history.

(56) References Cited

U.S. PATENT DOCUMENTS

| | | | | |
|---|---|---|---|---|
| 2011/0103059 | A1* | 5/2011 | Chen | F21V 31/005 362/249.02 |
| 2012/0250307 | A1* | 10/2012 | Germain | F21V 3/00 277/637 |
| 2015/0131287 | A1* | 5/2015 | Marsh | F21V 19/04 362/362 |
| 2016/0209023 | A1* | 7/2016 | Tseng | F21V 31/005 |
| 2017/0122544 | A1* | 5/2017 | Schmitt | F21V 3/02 |
| 2020/0300420 | A1* | 9/2020 | Guo | F21V 23/009 |
| 2020/0386397 | A1* | 12/2020 | Lewis, Jr. | F21V 23/003 |
| 2024/0175570 | A1* | 5/2024 | Lamberts | F21V 31/005 |

* cited by examiner

*Primary Examiner* — Bryon T Gyllstrom
(74) *Attorney, Agent, or Firm* — Harness, Dickey & Pierce, P.L.C.; Timothy J. Martin

(57) ABSTRACT

A waterproof light assembly includes first and second portions. The first portion includes a housing defining an interior region, a lens, and a first seal. The housing includes a flange having a first surface. The lens encloses a light assembly in the interior region. The light assembly is configured to emit light through the lens. The first seal is on the first surface and configured to engage a first side of a panel to form a watertight seal. The second portion is configured to be coupled to the first portion such that at least a portion of the panel is between the first portion and the second portion. The second portion includes a body and a second seal. The body includes a second surface. The second seal is on the second surface and configured to engage a second side of the panel to form a watertight seal.

20 Claims, 12 Drawing Sheets

DOUBLE SEAL, TWO-PIECE, WATERPROOF LIGHT

CROSS-REFERENCE TO RELATED APPLICATIONS

This application claims the benefit of U.S. Provisional Application No. 63/718,197, filed on Nov. 8, 2024. The entire disclosure of the above application is incorporated herein by reference.

FIELD

The present disclosure relates to a double seal, two-piece, waterproof light.

BACKGROUND

This section provides background information related to the present disclosure which is not necessarily prior art.

A number of different systems and structures exist for providing a drop or suspended ceiling or wall structures in a room. As will be appreciated by those skilled in the art, suspended ceilings are assembled such that they are spaced a predetermined distance below ceiling joists, in contrast to ceilings that are mounted directly on strips attached to a ceiling joist or an original ceiling structure. Suspended ceilings generally comprise a plurality of individual ceiling tiles. The individual tiles may take a number of overall geometries, but are typically rectangular or square.

Suspended ceiling systems may be used underneath elevated decks to provide a functional space in the region below the deck. The suspended ceiling systems may divert water away from the region below the deck. The ceiling tiles may be used with lights, such as recessed or cannister lights, to illuminate the region below the deck.

SUMMARY

This section provides a general summary of the disclosure, and is not a comprehensive disclosure of its full scope or all of its features.

An example of a waterproof light assembly for a panel includes a first portion and a second portion. The first portion includes a housing, a visibly transparent lens, and a first seal. The housing defines an interior region. The housing includes a flange having a first outer surface. The visibly transparent lens encloses a light assembly in the interior region. The light assembly is configured to emit light through the visibly transparent lens. The first seal is on the first outer surface. The first seal is configured to engage a first side of a panel to form a watertight seal between the panel and the first portion. The second portion is configured to be coupled to the first portion such that at least a portion of the panel is between the first portion and the second portion. The second portion includes a body and a second seal. The body includes a second outer surface. The second seal is on the second outer surface. The second seal is configured to engage a second side of the panel to form a watertight seal between the panel and the second portion.

In one aspect, the body of the second portion is an annular body defining a central opening. A portion of the housing extends through the central opening.

In one aspect, the housing includes a first thread. The body includes a second thread configured to engage the first thread to couple the housing to the body.

In one aspect, the housing includes an annular outer surface including the first thread. The body includes an annular inner surface including the second thread.

In one aspect, the body includes an annular outer surface defining a plurality of scalloped depressions.

In one aspect, the first seal is configured to engage an exterior surface of a panel. The second seal is configured to engage an interior surface of the panel.

In one aspect, the housing defines an opening to the interior region. Aan electrical cord for the light assembly extends from the interior region through the opening.

In one aspect, the first portion further includes a grommet surrounding the electrical cord. The grommet is at least partially within the opening. The grommet is configured to form a watertight seal between the electrical cord and the housing.

In one aspect, the light assembly has a central longitudinal axis. The opening is offset from the central longitudinal axis. The electrical cord extends from the housing in a direction perpendicular to the central longitudinal axis.

In one aspect, the first seal is configured to directly engage the housing. The second seal is configured to directly engage the body.

In one aspect, the first seal is in direct contact with the first outer surface. The second seal is in direct contact with the second outer surface.

In one aspect, the first seal is a first gasket. The second seal is a second gasket.

In one aspect, the first gasket and the second gasket comprise silicone rubber.

In one aspect, the housing and the body each comprise polyvinyl chloride (PVC), acrylonitrile styrene acrylate (ASA), or both ASA and PVC.

In one aspect, the housing includes a first component and a second component coupled to the first component.

In one aspect, the light assembly is a light emitting diode (LED) configured to operate at less than or equal to 1 watt.

An example of a waterproof light assembly for a panel includes an exterior portion and an interior portion. The exterior portion includes a housing, a visibly transparent lens, a light assembly, and a first gasket. The housing defines an interior regio. The housing includes a flange having an upper surface, a domed portion, and a cylindrical portion. The cylindrical portion is axially between the flange and the domed portion. The cylindrical portion includes an annular outer surface and a first plurality of threads on the annular outer surface. The visibly transparent lens is fixed to the housing. The light assembly is in the interior region. The light assembly is configured to emit light through the visibly transparent lens. The first gasket is on the upper surface. The interior portion includes an annular body and a second gasket. The annular body includes a bottom surface, an annular inner surface, and a second thread on the annular inner surface. The annular body defines a central opening. The second gasket is on the bottom surface. In an assembled configuration, the cylindrical portion extends through the central opening, the first plurality of threads engage the second thread to couple the exterior portion to the interior portion, the first gasket engages an exterior surface of the panel to form a first watertight seal, and the second gasket engages an interior surface of the panel to form a second watertight seal.

An example of a method of includes positioning a first light portion at least partially within a through hole of a panel such that a first seal of the first light portion engages a first side of the panel. The method further includes axially aligning a second light portion with the first light portion such that the first light portion extends through a central opening of the second light portion. The method further includes coupling the first light portion to the second light portion such that a second seal of the second light portion engages a second side of the panel opposite the first side of the panel.

In one aspect, the coupling includes rotating the second light portion with respect to the first light portion to engage a first thread of the first light portion with a second thread of the second light portion.

In one aspect, the coupling forms a first watertight seal between the first light portion and the panel and a second watertight seal between the second light portion and the panel.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
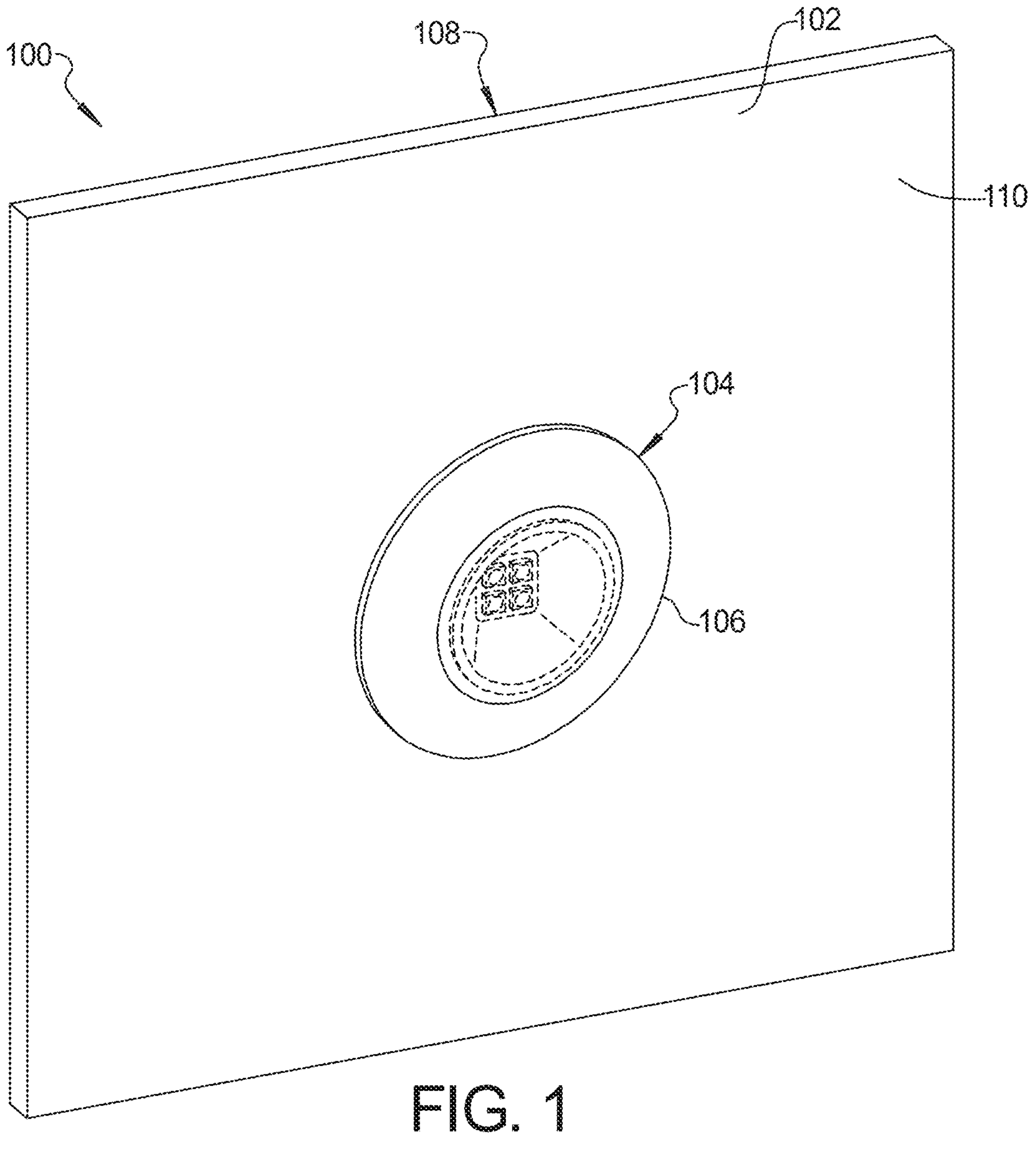
FIG. 1 is a perspective view of a panel assembly including an example of a waterproof light assembly.
Figure 3A:
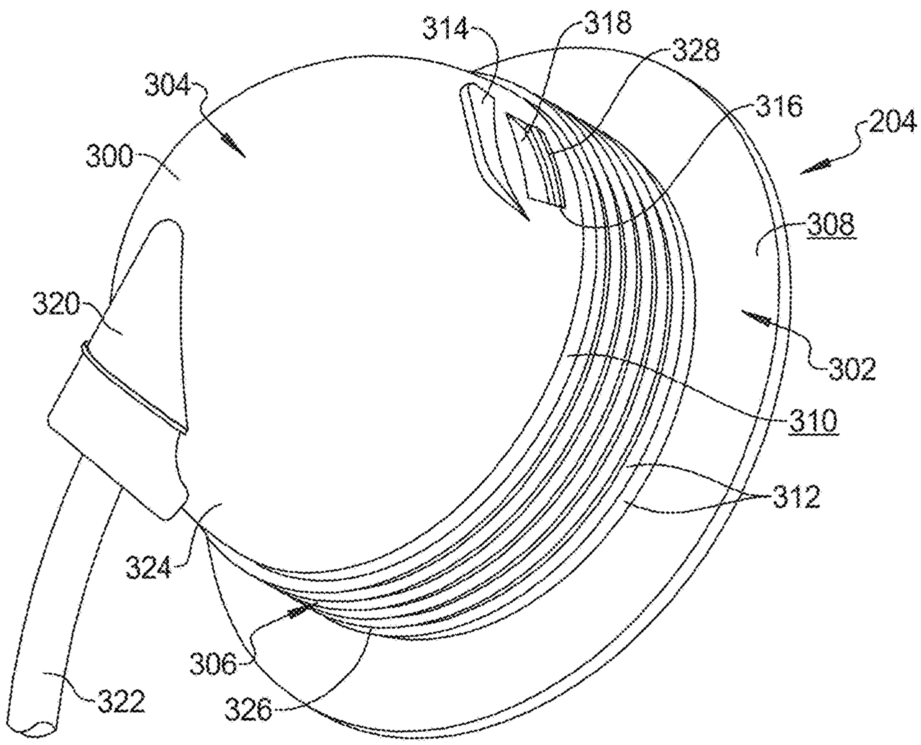
Figure 3B:
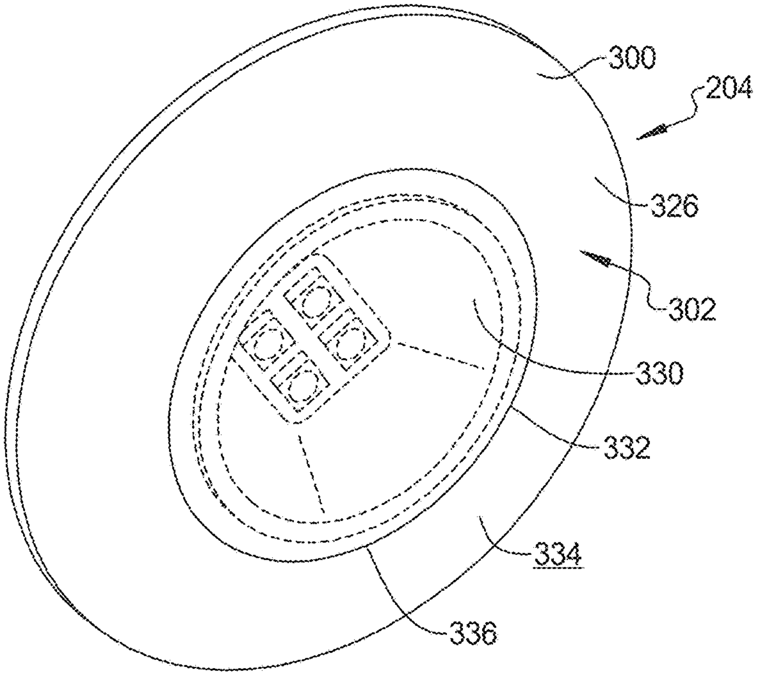

FIGS. 3A-3B illustrate an enclosure of the waterproof light assembly of FIG. 1. FIG. 3A is a top perspective view of the enclosure. FIG. 3B is a bottom perspective view of the enclosure.

Figure 4:
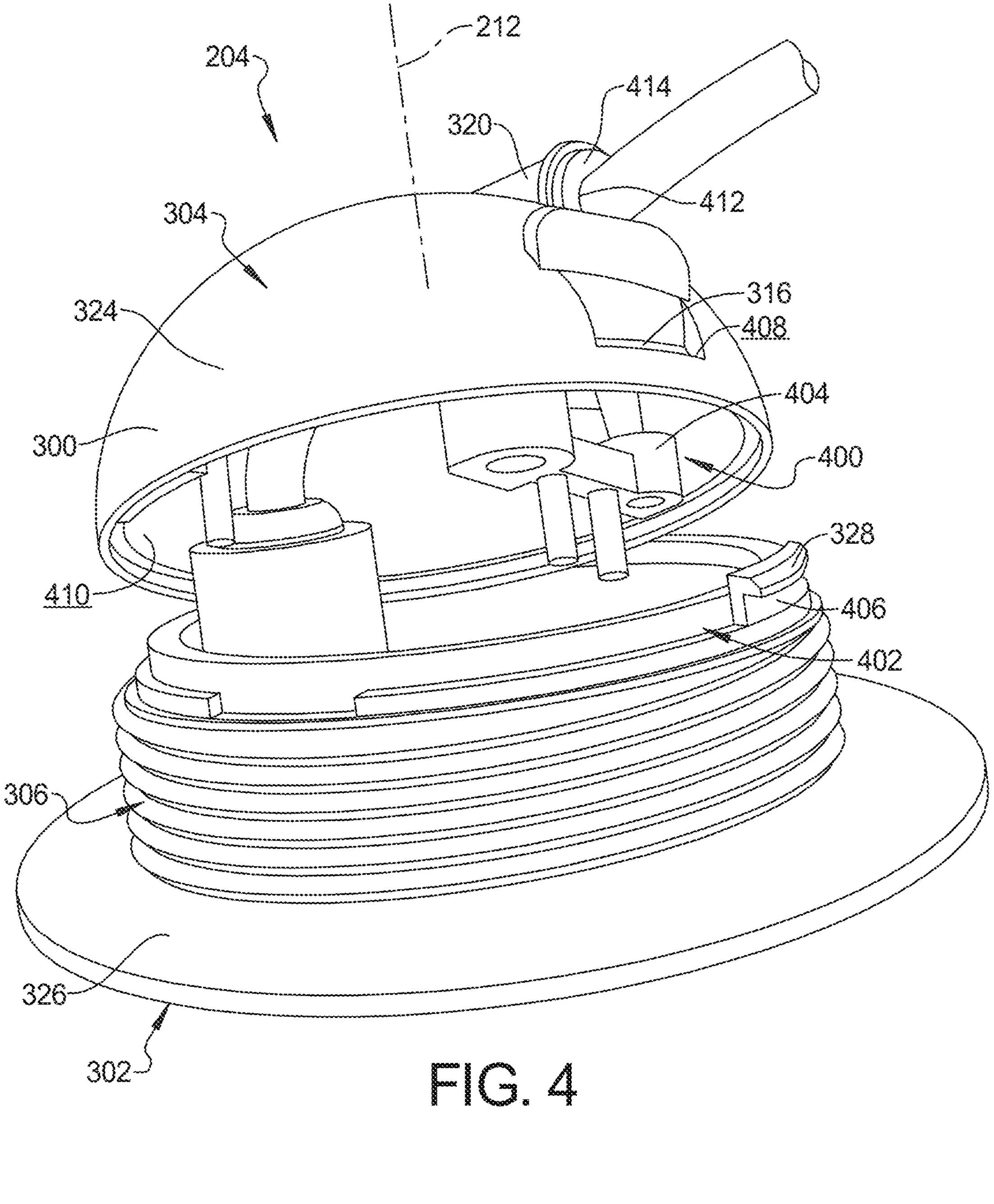

FIG. 4 is a top perspective view of the enclosure of FIGS. 3A-3B in a partially disassembled state.

Figure 5:
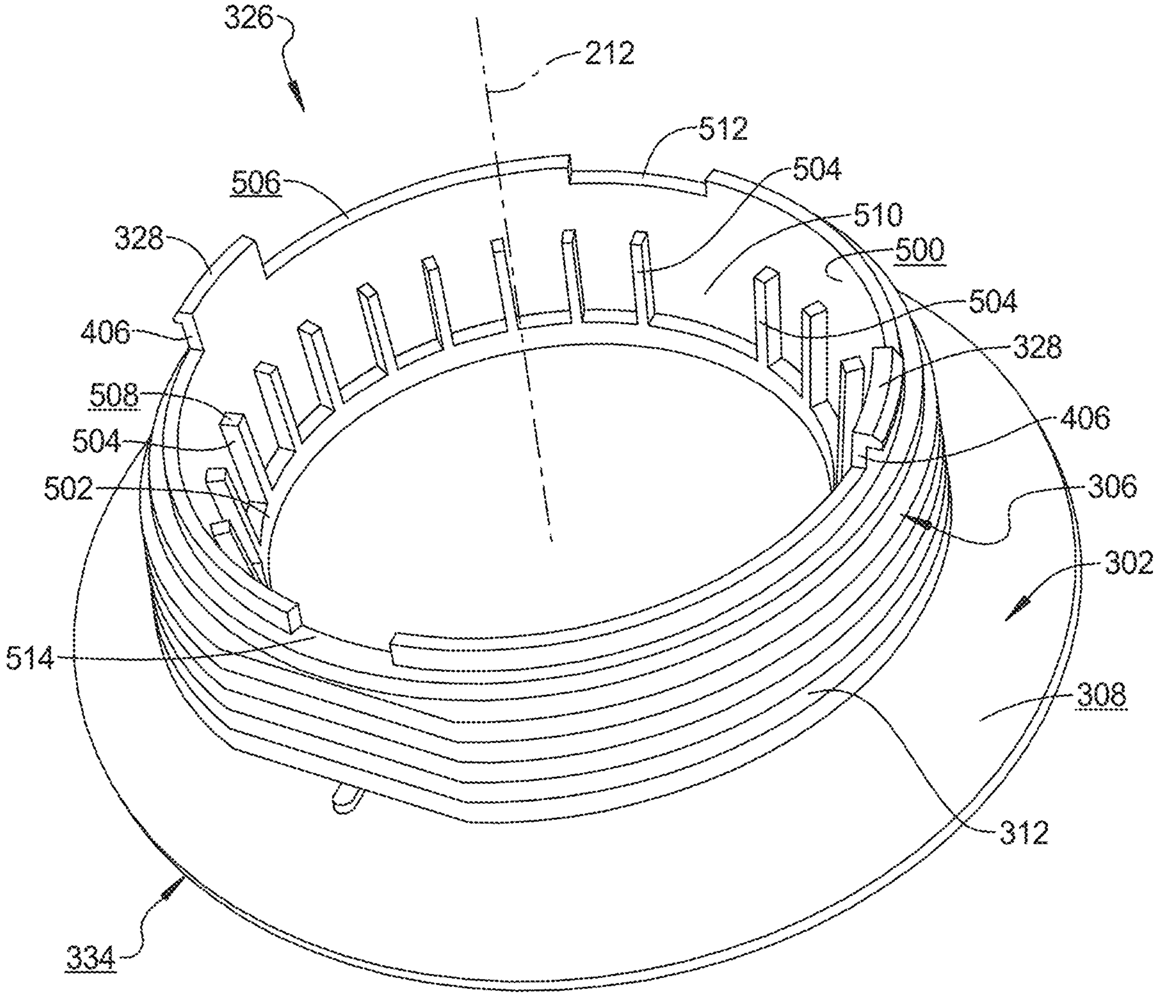

FIG. 5 is a top perspective view of a lower component of the enclosure of FIGS. 3A-3B.

Figure 6A:
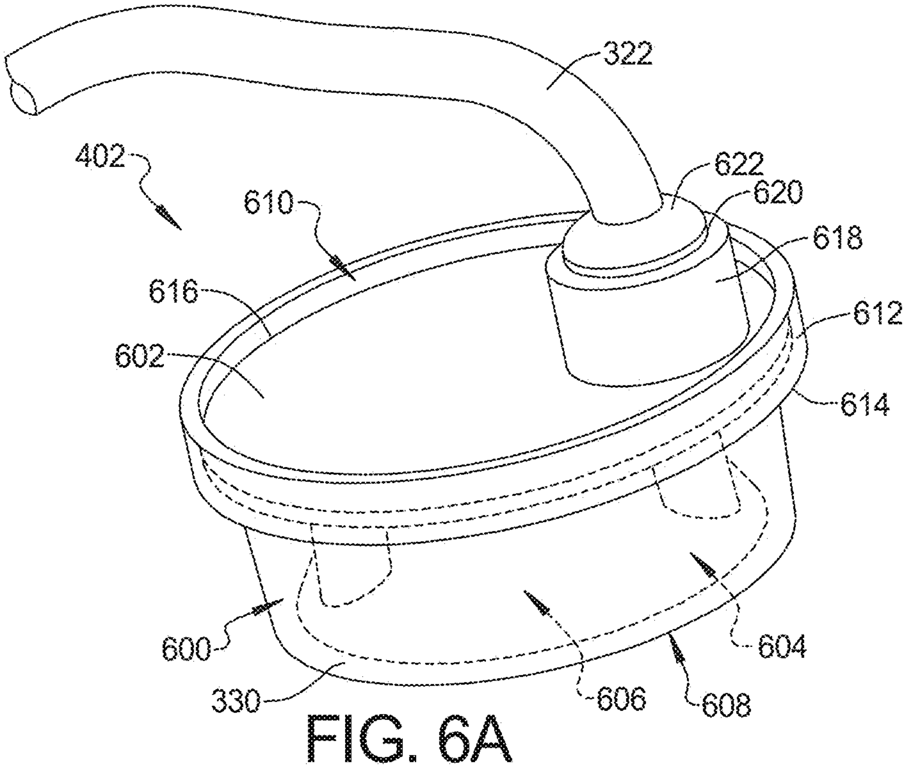
Figure 6B:
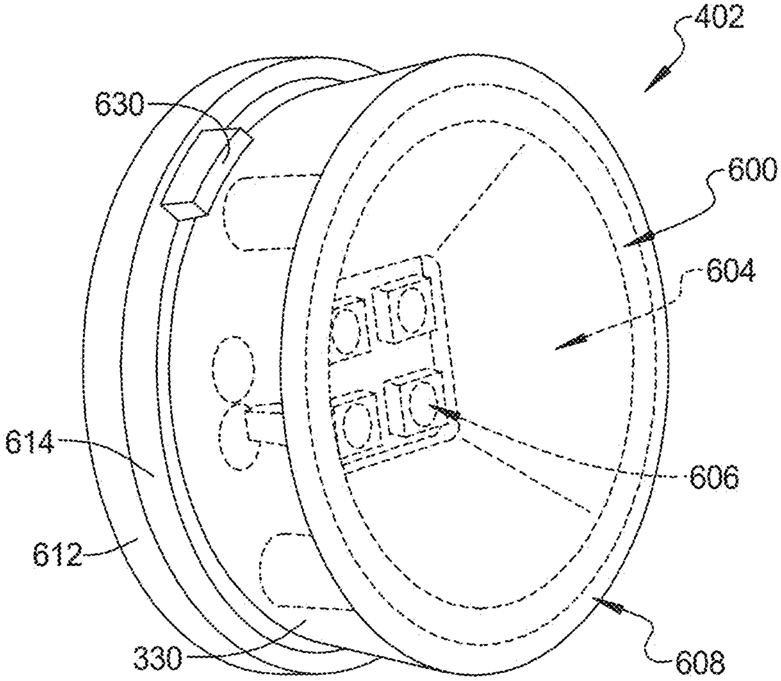

FIGS. 6A-6B illustrate a light subassembly of the waterproof light assembly of FIG. 1. FIG. 6A is a top perspective view of the light subassembly. FIG. 6B is a bottom perspective view of the light subassembly.

Figure 7:
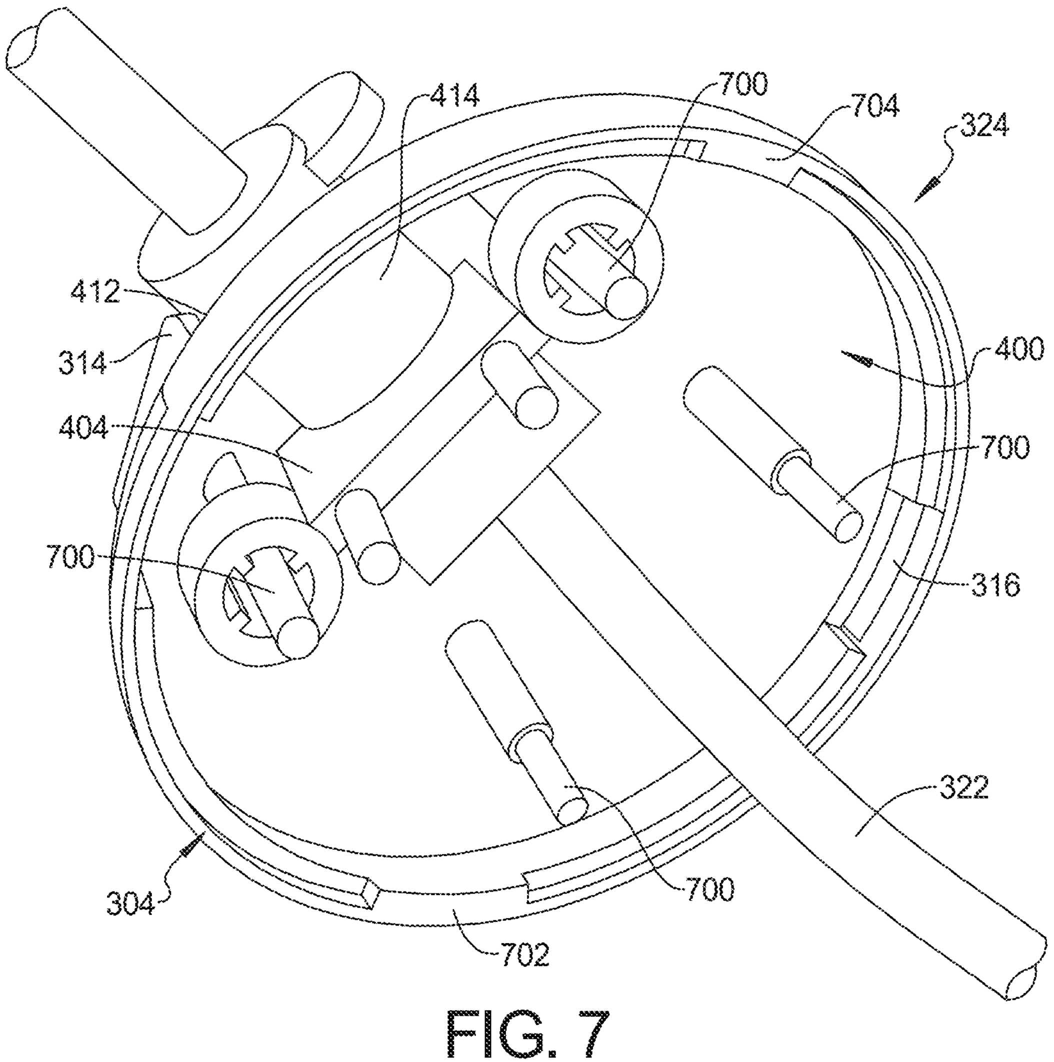

FIG. 7 is a bottom perspective view of an upper component of the enclosure of FIGS. 3A-3B.

Figure 8:
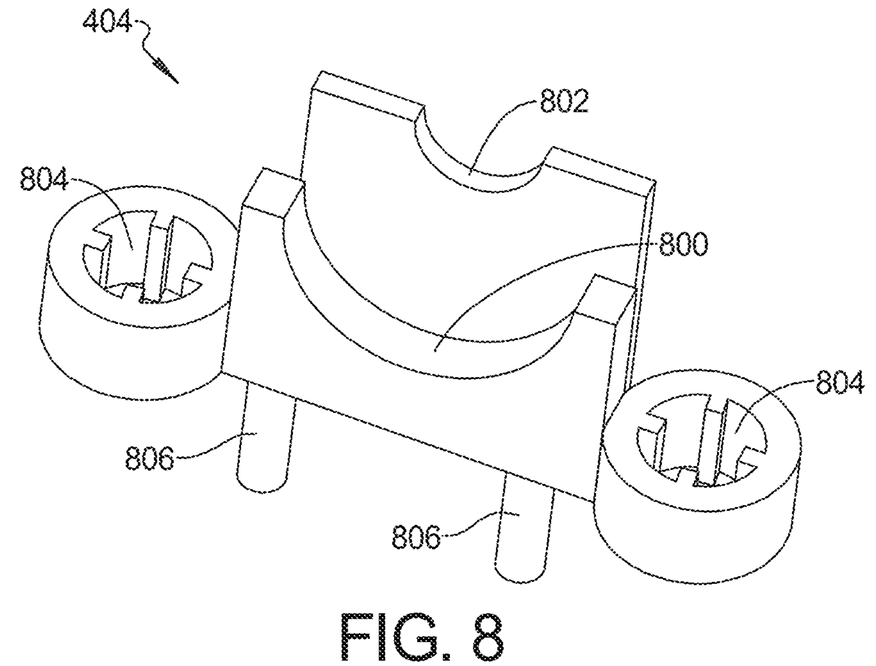

FIG. 8 is a perspective view of a cord fixture of the enclosure of FIG. 4.

Figure 9:
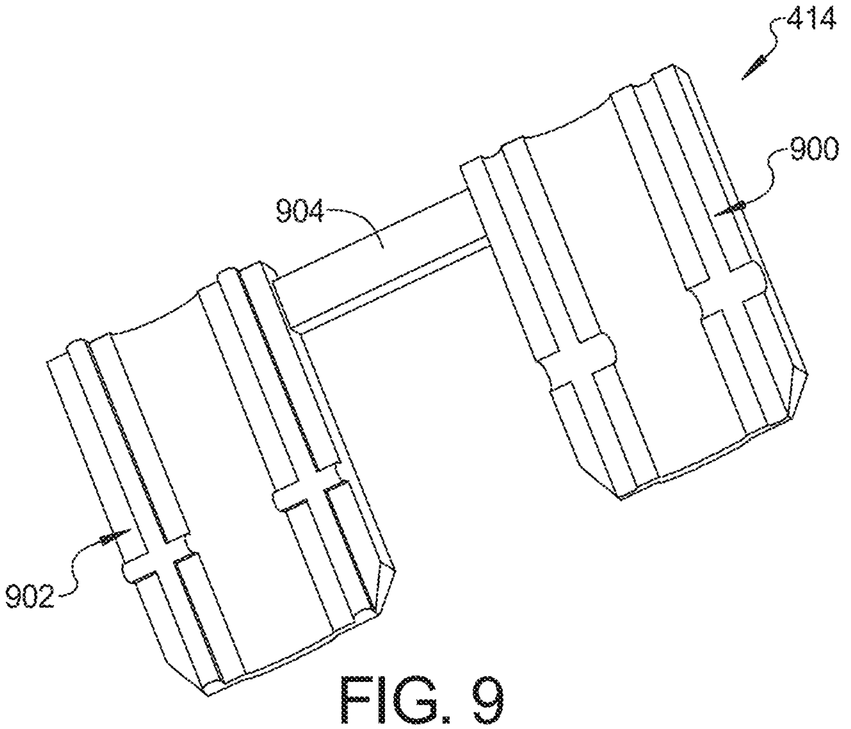

FIG. 9 is a perspective view of a grommet of the enclosure of FIG. 4 in an open position.

Figure 10A:
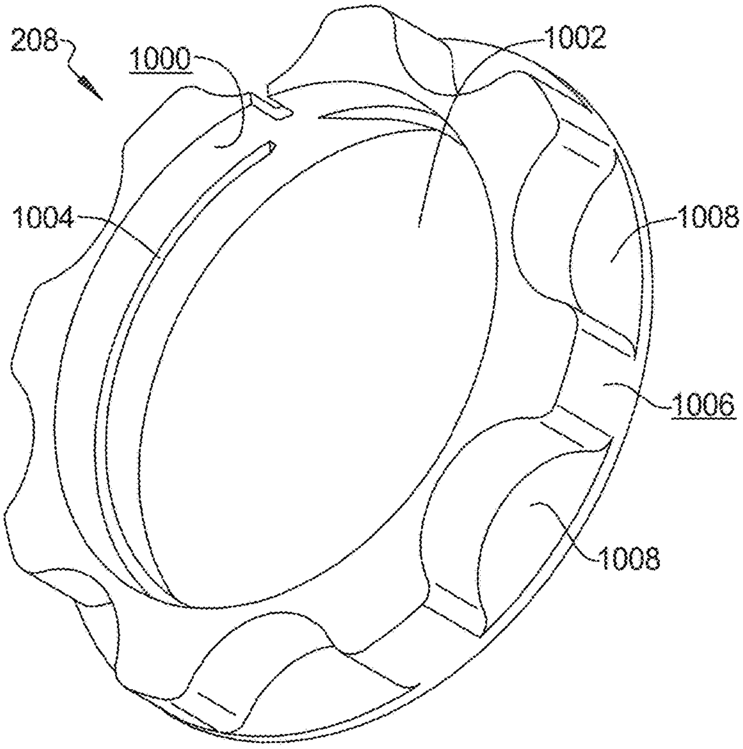
Figure 10B:
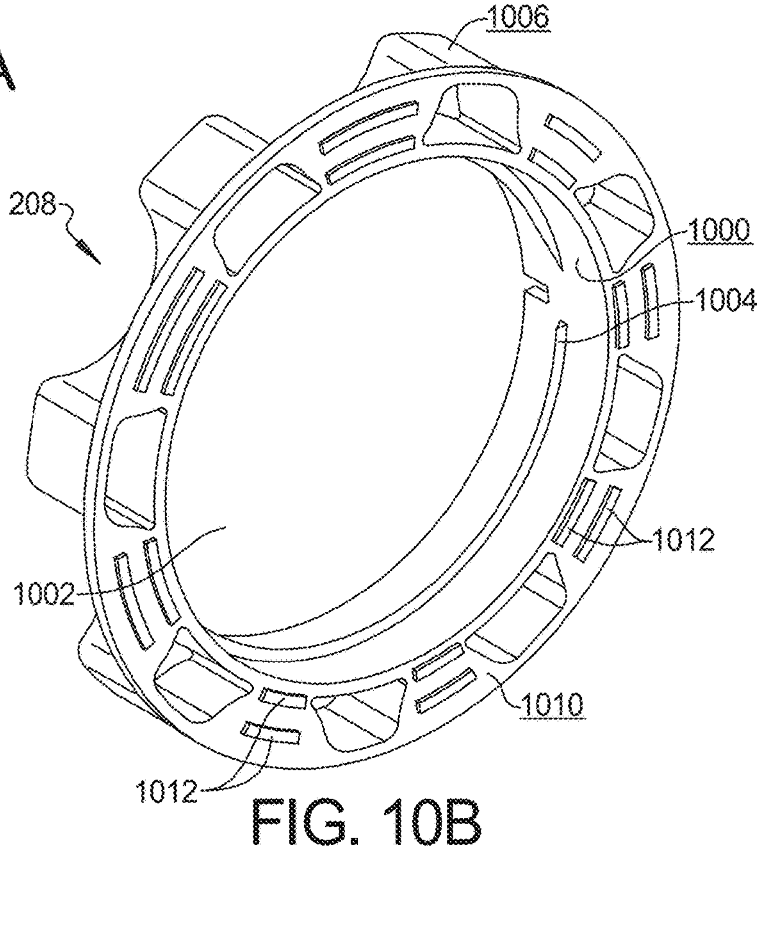

FIGS. 10A-10B illustrate a body of the waterproof light assembly of FIG. 1. FIG. 10A is a top perspective view of the body. FIG. 10B is a bottom perspective view of the body.

Figure 11A:
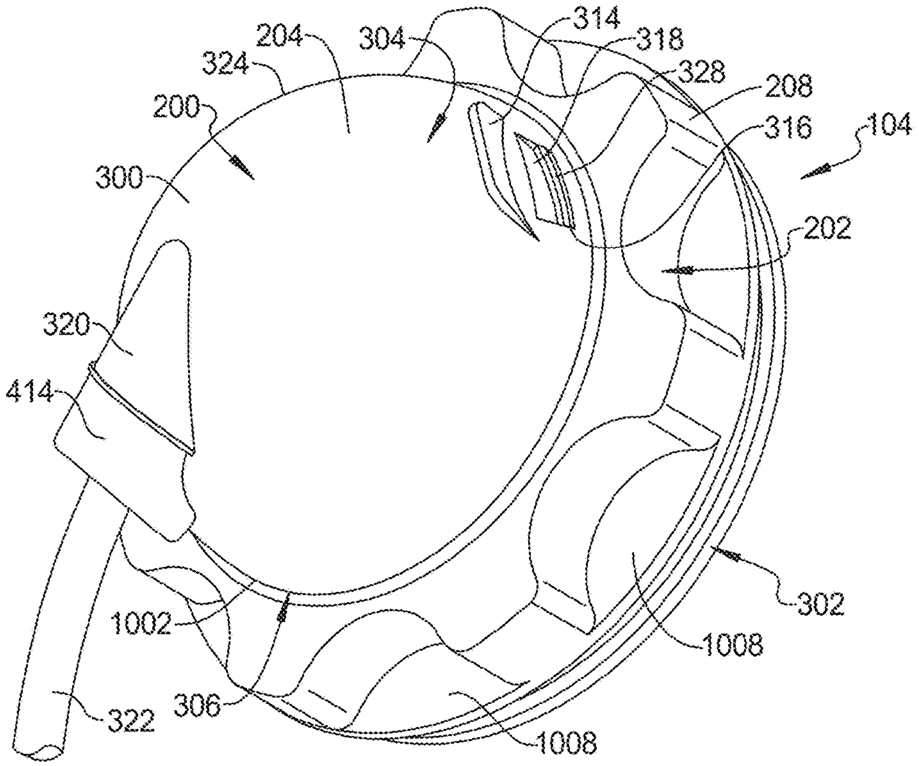
Figure 11B:
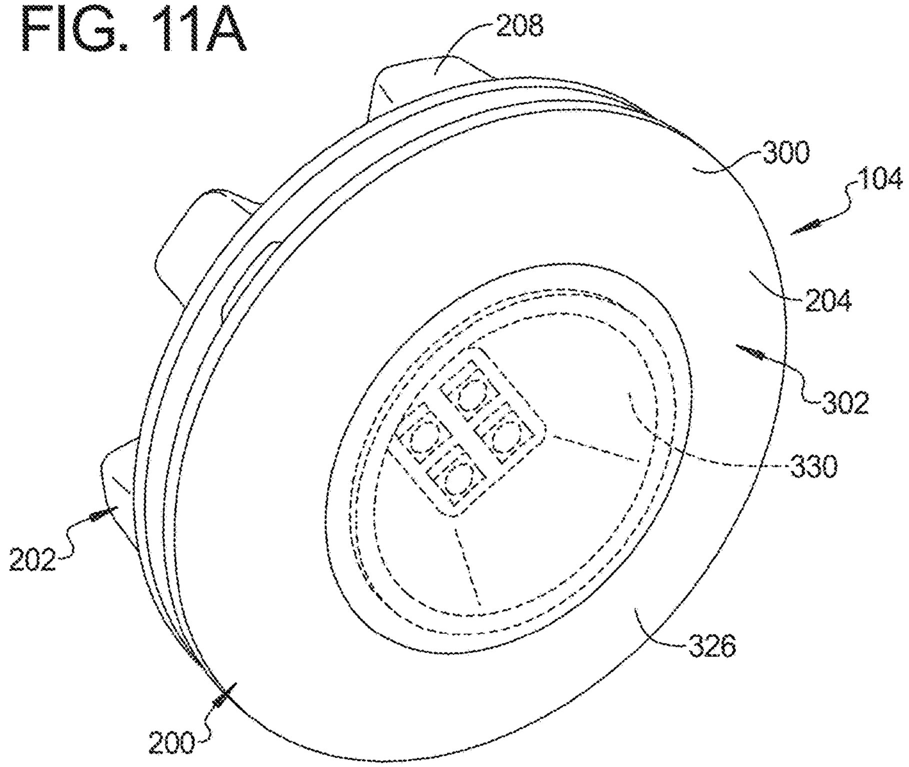

FIGS. 11A-11B illustrate the waterproof light assembly of FIG. 1. FIG. 11A is a top perspective view of the waterproof light assembly. FIG. 11B is a bottom perspective view of the waterproof light assembly.

Figure 12:
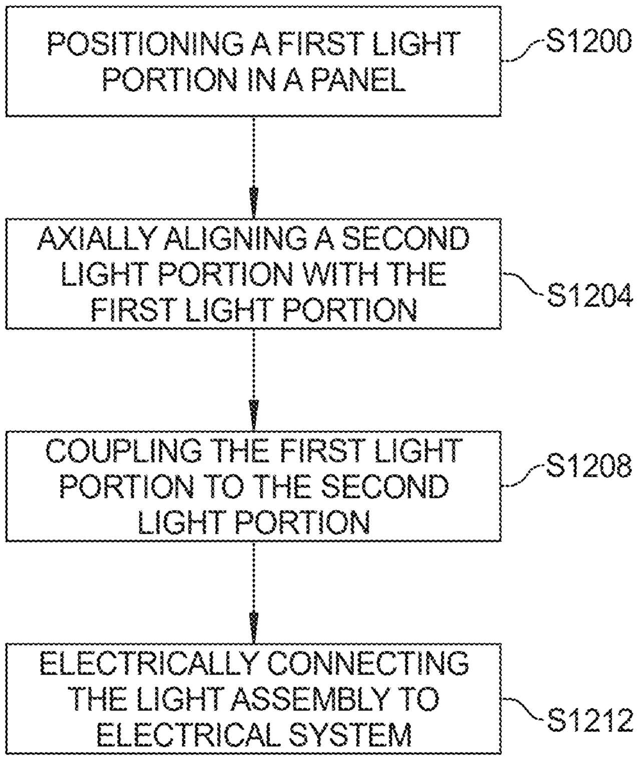

FIG. 12 is a flowchart illustrating a method of installing the waterproof light assembly of FIG. 1.

Figure 13:
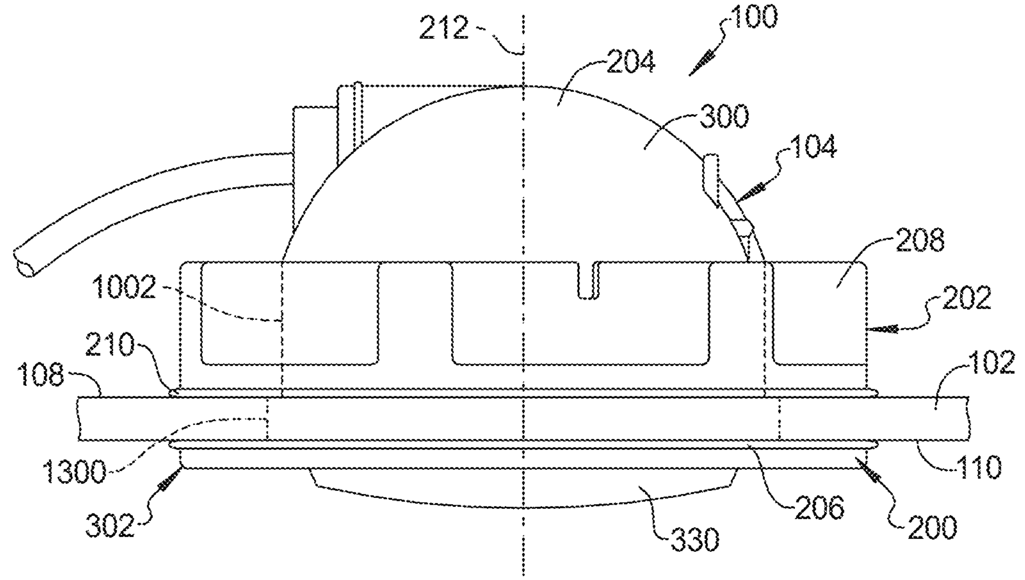

FIG. 13 is a schematic sectional view of the panel assembly of FIG. 1 in an assembled state.

Figure 14:
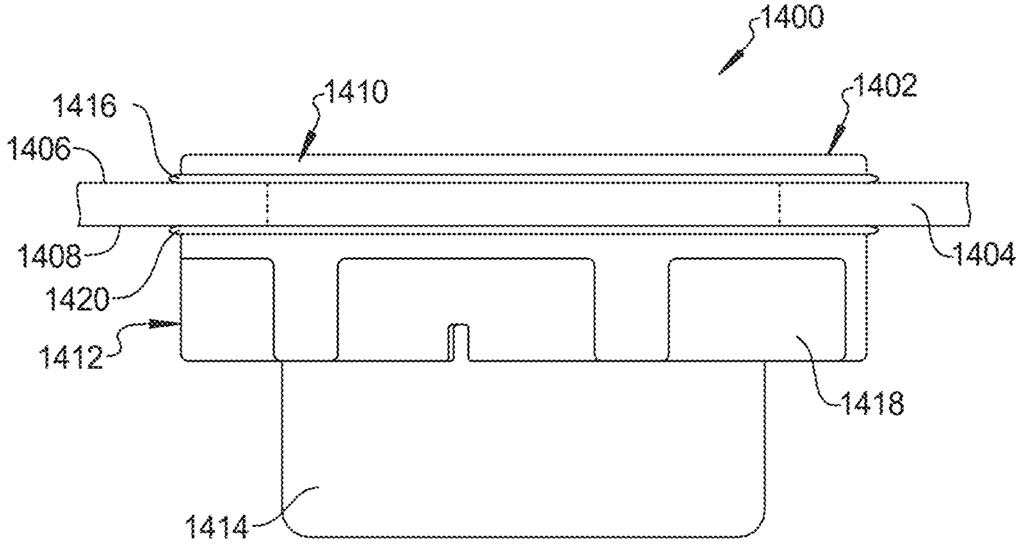

FIG. 14 is a schematic sectional view of a panel assembly including another example of a waterproof light assembly.

Corresponding reference numerals indicate corresponding parts throughout the several views of the drawings.

DETAILED DESCRIPTION

Example embodiments will now be described more fully with reference to the accompanying drawings.

In at least one example embodiment, as shown in FIG. 1, panel assembly 100 includes a soffit panel 102 and a light assembly 104. The light assembly 104 may also be referred to as a waterproof light assembly. The panel assembly 100 may be joined to other panel assemblies 100 and/or soffit panels without light assemblies to form an outdoor, underdeck ceiling. The ceiling may be configured to divert moisture to edges and/or drain systems so that a region under the ceiling remains dry.

A first joint 106 between the soffit panel 102 and the light assembly 104 may be watertight so that moisture cannot be transmitted from a top or interior surface 108 of the panel to a bottom or exterior surface 110 of the soffit panel 102 via a through hole in which the light assembly 104 is installed (see, e.g., though hole 1300 in FIG. 13). In some examples, the panel assembly 100 is installed substantially parallel to the ground (i.e., perpendicular to a direction of gravity/water flow). In other examples, the panel assembly 100 is installed substantially perpendicular to the ground. In other examples, the panel assembly 100 is installed at an angle oblique to the ground (e.g., as part of a sloped ceiling).

Although the panel assembly 100 is described as part of an outdoor, underdeck ceiling in the above example, it may also be used in other environments. For example, the panel assembly 100 and/or light assembly 104 may be used in other structures that are exposed to moisture. In one example, the light assembly 104 is orientated perpendicular to a ground to illuminate an outdoor wall, fence, and/or railing. In another example, the light assembly 104 is installed in an indoor environment, such as near a shower, bathtub, sauna, pool, and/or hot tub.

Figure 2:
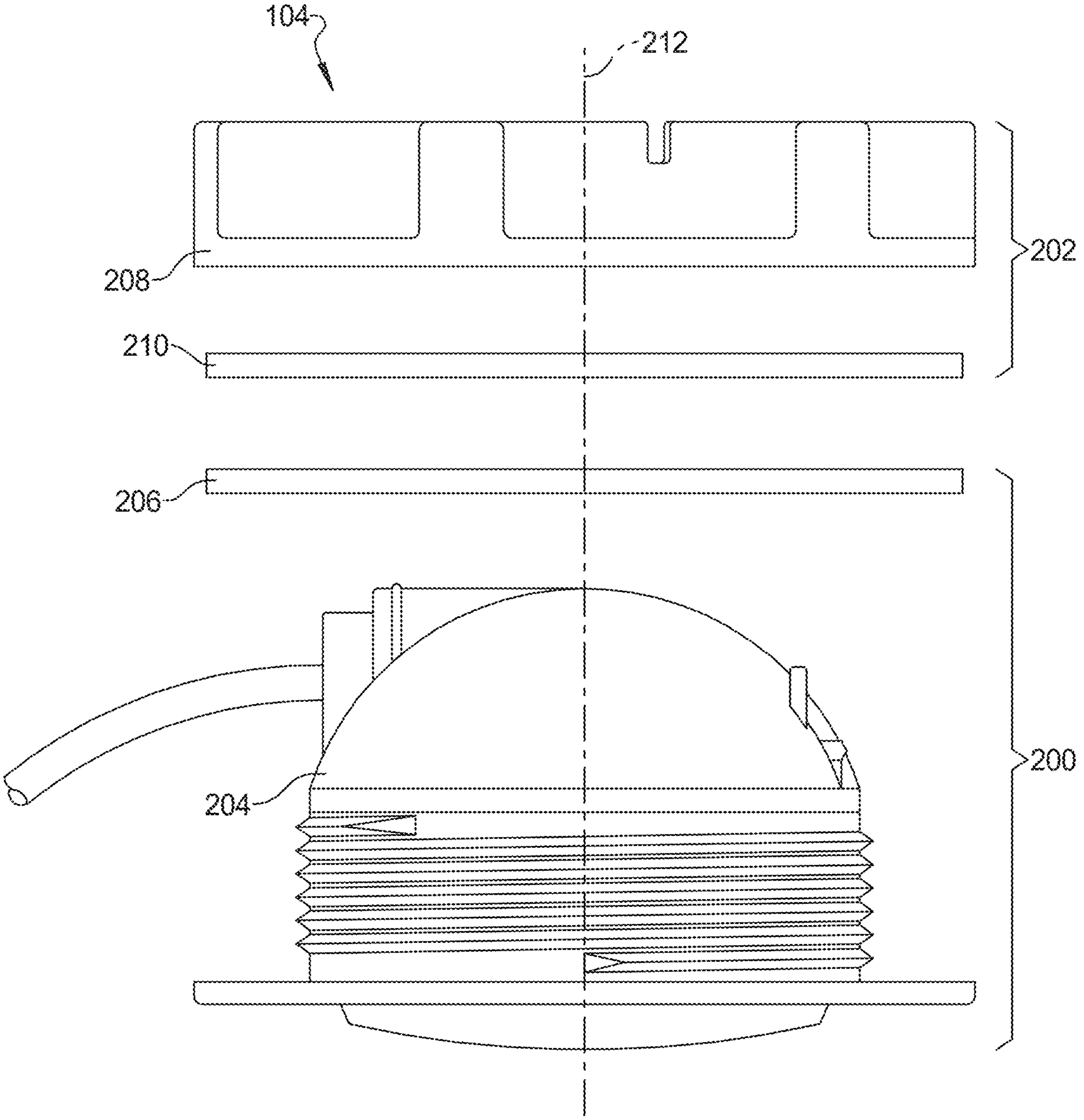
FIG. 2 is an exploded side view of the waterproof light assembly of FIG. 1.

In at least one example embodiment, as shown in FIG. 2, the light assembly 104 includes a first portion or subassembly 200 and a second portion or subassembly 202. The first portion 200 may be a lower and/or exterior portion. The first portion 200 includes a light enclosure 204 and a first seal 206. The second portion 202 may be an upper and/or interior portion. The second portion 202 includes a body 208 and a second seal 210. When assembled, the first portion 200 and the second portion 202 are aligned along a central longitudinal axis 212, as will be described in greater detail below in the discussion accompanying FIGS. 12-13.

The first seal 206 may be a first gasket. The second seal 210 may be a second gasket. In at least one example embodiment, the first seal 206 and/or second seal 210 are formed from or include silicone rubber.

In at least one example embodiment, as shown in FIG. 3A, the light enclosure 204 includes a housing 300. The housing 300 includes a flange portion 302, a distal portion 304, and a coupling portion 306 axially between the flange portion 302 and the distal portion 304. The flange portion 302 includes a top flange surface 308. In an assembled state, the first seal 206 (shown in FIG. 2) may be directly on the top flange surface 308.

In at least one example embodiment, the coupling portion 306 has a substantially cylindrical shape and may be referred to as a cylindrical portion. The coupling portion 306 may include a radially outer annular surface 310. The coupling portion 306 further includes a first thread, such as a first plurality of threads 312. The first threads 312 extend radially outwardly from the radially outer annular surface 310.

In at least one example embodiment, the distal portion 304 has a substantially dome or hemispherical shape, and may be referred to as a domed portion. The distal portion 304 includes a pair of axially protruding tabs 314, a pair of receptacles 316, a pair of flats 318, and an extension 320. The axially protruding tabs 314 may be aligned with the receptacles 316 and the flats 318, respectively, with the flats 318 between the receptacles 316 and the axially protruding tabs 314. A first set of axially protruding tab 314, receptacle 316, and flat 318 may be disposed opposite or 180° from a second set of axially protruding tab 314, receptacle 316, and flat 318. Each of the receptacles 316 may have a rectangular perimeter. The extension 320 may define a partially tubular shape. As will be described in greater detail below in the discussion accompanying FIGS. 4 and 7, the extension provides a passage for an electrical cord 322 to pass from inside the housing 300 to an exterior of the housing 300.

In at least one example embodiment, the housing 300 may have a two-piece structure including a first or upper component 324 and a second or lower component 326. The upper and lower components 324, 326 may be coupled together via radially extending tabs 328 that are partially in the receptacles 316. In at least one other example embodiment, the housing 300 may be integrally formed and have a single-piece unitary structure. In at least one example embodiment, the housing 300 is formed from or includes polyvinyl chloride (PVC), acrylonitrile styrene acrylate (ASA), or both ASA and PVC.

In at least one example embodiment, as shown in FIG. 3B, the light enclosure 204 includes a lens, which may be a visibly transparent lens 330. The housing 300 defines a lens aperture 332. The lens aperture 332 may be defined in a bottom flange surface 334 of the flange portion 302. The visibly transparent lens 330 is at least partially within the lens aperture 332. In at least the example embodiment shown, a portion of the visibly transparent lens 330 axially protrudes beyond the housing 300. In other example embodiments, a visibly transparent lens may be flush or recessed with respect to a housing. In at least one example embodiment, a second joint 336 between the visibly transparent lens 330 and the housing 300 may be watertight.

In at least one example embodiment, as shown in FIG. 4, the housing 300 at least partially defines a housing interior region 400. The housing interior region 400 contains a light subassembly 402, as will be described in greater detail in the discussion accompanying FIGS. 6A-6B. The housing interior region 400 may also contain a cord fixture 404, as will be described in greater detail in the discussion accompanying FIGS. 7-8.

The lower component 326 includes a pair of axially extending arms 406. Each of the axially extending arms 406 includes a respective one of the radially extending tabs 328. The axially extending arms 406 are configured to pivot or flex radially inwardly so that the upper component 324 can be snapped over the axially extending arms 406 to couple the upper component 324 and the lower component 326.

As discussed above, when the upper and lower components 324, 326 are coupled to one another, the radially extending tabs 328 are at least partially in the receptacles 316, respectively. Each of the radially extending tabs 328 may engage a respective receptacle surface 408 to reduce or prevent movement of the upper component 324 with respect to the lower component 326 along and about the central longitudinal axis 212. Engagement of the axially extending arms 406 with a first inside surface 410 of the upper component 324 may reduce or prevent movement of the upper component 324 with respect to the lower component 326 perpendicular to the central longitudinal axis 212.

The housing 300 defines a first cord opening 412. The first cord opening 412 may be defined in an end of the extension 320 of the distal portion 304. The first cord opening 412 may be offset from the central longitudinal axis 212. In other example embodiments a cord opening may be aligned with a central longitudinal axis. The electrical cord 322 may project from the housing interior region 400 via the first cord opening 412 in a direction perpendicular to the central longitudinal axis 212. In other example embodiments, an electrical cord may project from a housing in a direction non-perpendicular (e.g., parallel) to a central longitudinal axis.

A watertight seal may be provided between the electrical cord 322 and the housing 300. In at least one example embodiment, a first grommet 414 is disposed circumferentially around a portion of the electrical cord 322 such that the first grommet 414 is between the electrical cord 322 and the housing 300. The first grommet 414 extends at least partially into the housing interior region 400. In at least one example embodiment, the first grommet 414 is formed from or includes silicone rubber.

In at least one example embodiment, as shown in FIG. 5, the lower component 326 includes a second inside surface 500. The second inside surface 500 may be an annular surface. The lower component 326 may further include an annular projection 502 that extends radially inwardly from the second inside surface 500. The annular projection 502 may be adjacent to the bottom flange surface 334.

The lower component 326 may include a plurality of axial ribs 504. The axial ribs 504 may protrude radially inwardly from the second inside surface 500. The axial ribs 504 may extend from the annular projection 502 toward an end surface 506 of the lower component 326. The axial ribs 504 may extend along less than the entire height (i.e., parallel to the central longitudinal axis 212) of the lower component 326. Each of the axial ribs 504 includes a rib top or stop surface 508 configured to engage the light subassembly 402 (shown in FIG. 4), as will be described in greater detail below in the discussion accompanying FIGS. 6A-6B. In some example embodiments, a lower component may include different or additional features for engagement with a light subassembly.

In at least one example embodiment, a light alignment gap 510 is defined between two of the axial ribs 504. The axial ribs 504 may be equally spaced from one another around the second inside surface 500 except at the light alignment gap 510. The light alignment gap 510 may be configured to receive a corresponding tab (see, e.g., light alignment tab 630 of FIG. 6B) on the light subassembly 402 to facilitate desired positioning of the light subassembly 402 about the central longitudinal axis 212.

In at least one example embodiment, the end surface 506 of the lower component 326 defines a first notch 512 and a second notch 514. The first and second notches 512, 514 may have different sizes and/or shapes. In the example embodiment shown, the first notch 512 is wider than the second notch 514. The first and second notches 512, 514 are configured to receive corresponding protrusions (see, e.g., first and second alignment protrusions 702, 704 of FIG. 7) on the upper component 324 (shown in FIG. 4) to facilitate desired positioning of the upper component 324 about the central longitudinal axis 212. In some example embodiments, upper and lower components include different or additional features to facilitate respective positioning of the upper and lower components.

In at least one example embodiment, as shown in FIG. 6A, the light subassembly 402 includes a case 600. The case 600 includes the visibly transparent lens 330 and a cap 602. The visibly transparent lens 330 and the cap 602 cooperate to define a case interior region 604.

A light emitting diode (LED) assembly 606 is disposed in the case interior region 604. In at least one example embodiment, the LED assembly 606 may include a low-power LED, such as an LED configured to operate at less than or equal to about 1 watt. However, the LED assembly 606 may alternatively include one or more LEDs configured to operate within different power ranges. The LED assembly 606 may be configured to emit light at a desired color temperature (e.g., warm white, bright white, daylight, cool white, etc.). Additionally or alternatively, the LED assembly 606 may be configured to emit colored light.

The visibly transparent lens 330 may have a closed end 608 that is at least partially exposed via the lens aperture 332 (shown in FIG. 3B) and an open end 610. In at least one example embodiment, the visibly transparent lens 330 has a cup shape, as shown. However, a visibly transparent lens may have other shapes, such as a hemispherical shape or a lens shape, for example. The visibly transparent lens 330 may include an annular rim 612 and a radially extending step 614 at the open end 610. The cap 602 may be disposed at least partially in the visibly transparent lens 330. In at least the example embodiment shown, the cap 602 is fully recessed within the visibly transparent lens 330 and engaging the radially extending step 614.

A third joint 616 between the visibly transparent lens 330 and the cap 602 is watertight. In at least one example embodiment, the cap 602 is ultrasonically welded to the visibly transparent lens 330. The visibly transparent lens 330 and the cap 602 may be formed from materials that are capable of being ultrasonically welded. In at least one example embodiment, the visibly transparent lens 330 is formed from polymethyl methacrylate (PMMA) and the cap 602 is formed from acrylonitrile butadiene styrene (ABS). In at least the example embodiment shown, the entire visibly transparent lens 300 is visibly transparent. However, in some example embodiments, only a portion of a visibly transparent lens, such as an end surface, is visibly transparent, while a remainder of the visibly transparent lens, such as a circumferential or side surface, is visibly opaque.

A watertight seal may be provided between the electrical cord 322 and the case 600. The cap 602 may include a boss 618 defining a second cord opening 620. A second grommet 622 may be disposed radially around a portion of the electrical cord 322 such that it is between the electrical cord 322 and the boss 618. The second grommet 622 is at least partially inside the boss 618. In at least one example embodiment, the second grommet 622 is formed from or includes silicone rubber.

In at least one example embodiment, as shown in FIG. 6B, the light subassembly 402 includes a light alignment tab 630. The light alignment tab 630 may be on the visibly transparent lens 330. The light alignment tab 630 is configured to be received in the light alignment gap 510 (shown in FIG. 5) of the lower component 326 (shown in FIG. 5) to facilitate desired positioning of the light subassembly 402, as discussed above.

In at least one example embodiment, as shown in FIG. 7, the upper component 324 includes a plurality of first axially extending pegs 700. The first axially extending pegs 700 are configured to engage the cap 602 of the light subassembly 402 (shown in FIG. 6A) to facilitate axial positioning of the light subassembly 402 within the housing interior region 400.

In at least one example embodiment, the upper component 324 includes a first alignment protrusion 702 and a second alignment protrusion 704. The first and second alignment protrusions 702, 704 may be configured to be received by the first and second notches 512, 514 of the lower component 326 (shown in FIG. 5) to facilitate desired positioning of the upper component 324 with respect to the lower component 326, as described above. The first and second alignment protrusions 702, 704 may have different sizes and/or shapes corresponding to the first and second notches 512, 514. For example, the first alignment protrusion 702 may be wider than the second alignment protrusion 704.

When the light enclosure 204 (shown in FIG. 4) is assembled, the cord fixture 404 is within the upper component 324. For example, the cord fixture 404 may be disposed around at least two of the first axially extending pegs 700 to retain the cord fixture 404 in a desired position. The cord fixture 404 may receive a portion of the first grommet 414 and a portion of the electrical cord 322 to guide the electrical cord 322 between the second cord opening 620 (shown in FIG. 6A) of the boss 618 (shown in FIG. 6A) and the first cord opening 412 of the distal portion 304.

In at least one example embodiment, as shown in FIG. 8, the cord fixture 404 defines a first cradle 800 and a second cradle 802. The first and second cradles 800, 802 may each be partially cylindrical. The first cradle 800 may have a larger diameter than the second cradle 802. The first cradle 800 is configured to support a portion of the first grommet 414 (shown in FIG. 7), and the second cradle 802 is configured to support a portion of the electrical cord 322 (shown in FIG. 7).

The cord fixture 404 may define two or more passages 804. The first axially extending pegs 700 (shown in FIG. 7) of the upper component 324 (shown in FIG. 7) may be configured to extend through respective passages 804 to facilitate positioning of the cord fixture 404 in the upper component 324. The cord fixture 404 may further include second axially extending pegs 806. The second axially extending pegs 806 may engage the cap 602 (shown in FIG. 6A) of the light subassembly (FIG. 6A) when the light enclosure 204 is assembled.

In at least one example embodiment, as shown in FIG. 9, the first grommet 414 includes a first grommet portion 900, a second grommet portion 902, and a tether 904 connecting the first and second grommet portions 900, 902. Each of the first and second grommet portions 900, 902 defines a semi-cylindrical shape. The first and second grommet portions 900, 902 can be closed or clamped around the electrical cord 322 (shown in FIG. 7).

In at least one example embodiment, as shown in FIG. 10A, the body 208 is an annular body. The body 208 may include an annular inner surface 1000 defining a central opening 1002. In at least one example embodiment, the body 208 is formed from or includes polyvinyl chloride (PVC), acrylonitrile styrene acrylate (ASA), or both ASA and PVC.

The body 208 may include a second thread 1004 or plurality of threads. The second thread 1004 is on the annular inner surface 1000. The second thread 1004 is configured to engage the plurality of first threads 312 (shown in FIG. 3A) to couple the body 208 to the light enclosure 204 (shown in FIG. 3A).

The body 208 includes an annular outer surface 1006. The annular outer surface 1006 may define a plurality of scalloped depressions 1008. The scalloped depressions 1008 are configured to receive an installation tool and/or fingers of an installer during installation of the light assembly 104 to a soffit panel 102 (shown in FIG. 1).

In at least one example embodiment, as shown in FIG. 10B, the body 208 includes a bottom body surface 1010. The second seal 210 (shown in FIG. 2) may be configured to be disposed on and engage the bottom body surface 1010. The body 208 may further include a plurality of arc-shaped ribs 1012. The arc-shaped ribs 1012 may press into the second seal 210 when the light assembly 104 (shown in FIG. 1) is installed.

As shown in FIGS. 11A-11B, the first and second portions 200, 202 are configured to be coupled to one another. In the example embodiment shown, the first and second portions 200, 202 are coupled to one another via first threads 312 (shown in FIG. 3A) and second thread 1004 (shown in FIG. 10A). In other embodiments, first and second portions are coupled via other features, such as snap-fit features and/or discrete fasteners.

When the first and second portions 200, 202 are coupled to one another, the housing 300 of the first portion 200 is at least partially within the central opening 1002 of the second portion 202. For example the coupling portion 306 of the housing 300 may be at least partially within the central opening 1002. At least a portion of the distal portion 304 may protrude axially beyond the central opening 1002.

FIG. 12 illustrates an example embodiment of a method of assembling a waterproof light assembly to a panel, such as a soffit panel. The method generally includes positioning a first light portion in a panel at S1200; axially aligning a second light portion with the first light portion at S1204; coupling the first light portion to the second light portion at S1208; and electrically connecting the light assembly to an electrical system S1212. The method may be performed using the light assembly 104 and soffit panel 102 of FIG. 1.

With reference to FIG. 13, positioning the first portion 200 within the soffit panel 102 may include inserting a portion of the light enclosure 204 into a through hole 1300 in the soffit panel 102. The first seal 206 is between the flange portion 302 of the housing 300 and the exterior surface 110 of the soffit panel 102. The first seal 206 may directly engage the housing 300 and the soffit panel 102.

Axially aligning the second portion 202 with the first portion 200 may include disposing the body 208 at least partially around the light enclosure 204. A portion of the light enclosure 204 may be within the central opening 1002 of the body 208. A portion of the light enclosure 204 may project beyond the body 208.

Coupling the first and second portions 200, 202 may include engaging first and second threads 312, 1004 (shown in FIGS. 3A and 10A) with one another. For example, an installer may hold the first portion 200 in a fixed position while rotating the second portion 202 about the central longitudinal axis 212. The installer may grasp the body 208 by placing a tool or their fingers in the scalloped depressions 1008 (shown in FIG. 10A) of the body 208.

The installer may continue rotating the second portion 202 until a desired pressure between the first and second seals 206, 210 and the soffit panel 102 is reached. In at least one example embodiment, the visual appearance of the first seal 206 and/or second seal 210 indicates that the desired pressure is present. For example, the first and/or second seal 206, 210 may bulge radially outwardly beyond the body 208 and/or flange portion 302, respectively, and/or have a flattened appearance compared to in a pre-installed state. The second seal 210 is between the body 208 and the interior surface 108 of the soffit panel 102. The second seal 210 may directly engage the body 208 and the soffit panel 102.

FIG. 14 illustrates an example of another panel assembly 1400. The panel assembly 1400 is similar to the panel assembly 100 of FIGS. 1 and 13 except as described below. The panel assembly 1400 includes a light assembly 1402 assembled to a soffit panel 1404 having an inside surface 1406 and an outside surface 1408.

The light assembly 1402 includes a first portion 1410 and a second portion 1412. The first portion includes a light enclosure 1414 and a first seal 1416. The second portion 1412 includes a body 1418 and a second seal 1420. The first seal 1416 is between the light enclosure 1414 and the inside surface 1406. The second seal 1420 is between the body 1418 and the outside surface 1408. Compared to the light enclosure 204 of FIGS. 3A-5, positions of internal components (e.g., light subassembly, cord fixture) are different to facilitate illumination of a region on the outside of the soffit panel 102.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected, or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%. In addition, disclosure of ranges includes disclosure of all values and further divided ranges within the entire range, including endpoints and sub-ranges given for the ranges.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A waterproof light assembly for a panel, the waterproof light assembly comprising:
- a first portion including:
  - a housing defining an interior region and including a flange having a first outer surface;
  - a visibly transparent lens enclosing a light assembly in the interior region, the light assembly configured to emit light through the visibly transparent lens; and
  - a first seal on the first outer surface, the first seal configured to engage a first side of a panel to form a watertight seal between the panel and the first portion; and
- a second portion configured to be coupled to the first portion such that at least a portion of the panel is between the first portion and the second portion, the second portion including:
  - a body including a second outer surface; and
  - a second seal on the second outer surface, the second seal configured to engage a second side of the panel to form a watertight seal between the panel and the second portion.

2. The waterproof light assembly of claim 1, wherein
- the body of the second portion is an annular body defining a central opening, and
- a portion of the housing extends through the central opening.

3. The waterproof light assembly of claim 1, wherein
- the housing includes a first thread, and
- the body includes a second thread configured to engage the first thread to couple the housing to the body.

4. The waterproof light assembly of claim 3, wherein
- the housing includes an annular outer surface including the first thread, and
- the body includes an annular inner surface including the second thread.

5. The waterproof light assembly of claim 3, wherein the body includes an annular outer surface defining a plurality of scalloped depressions.

6. The waterproof light assembly of claim 1, wherein
- the first seal is configured to engage an exterior surface of a panel, and
- the second seal is configured to engage an interior surface of the panel.

7. The waterproof light assembly of claim 1, wherein
- the housing defines an opening to the interior region, and
- an electrical cord for the light assembly extends from the interior region through the opening.

8. The waterproof light assembly of claim 7, wherein
- the first portion further includes a grommet surrounding the electrical cord and at least partially within the opening, and
- the grommet is configured to form a watertight seal between the electrical cord and the housing.

9. The waterproof light assembly of claim 7, wherein
- the light assembly has a central longitudinal axis,
- the opening is offset from the central longitudinal axis, and
- the electrical cord extends from the housing in a direction perpendicular to the central longitudinal axis.

10. The waterproof light assembly of claim 1, wherein
the first seal is configured to directly engage the housing, and
the second seal is configured to directly engage the body.

11. The waterproof light assembly of claim 1, wherein
the first seal is in direct contact with the first outer surface, and
the second seal is in direct contact with the second outer surface.

12. The waterproof light assembly of claim 1, wherein
the first seal is a first gasket, and
the second seal is a second gasket.

13. The waterproof light assembly of claim 12, wherein the first gasket and the second gasket comprise silicone rubber.

14. The waterproof light assembly of claim 1, wherein the housing and the body each comprise polyvinyl chloride (PVC), acrylonitrile styrene acrylate (ASA), or both ASA and PVC.

15. The waterproof light assembly of claim 1, wherein the housing includes a first component and a second component coupled to the first component.

16. The waterproof light assembly of claim 1, wherein the light assembly is a light emitting diode (LED) configured to operate at less than or equal to 1 watt.

17. A waterproof light assembly for a panel, the waterproof light assembly comprising:
an exterior portion including:
a housing defining an interior region and including:
a flange having an upper surface;
a domed portion; and
a cylindrical portion axially between the flange and the domed portion, the cylindrical portion including an annular outer surface and a first plurality of threads on the annular outer surface;
a visibly transparent lens fixed to the housing;
a light assembly in the interior region and configured to emit light through the visibly transparent lens; and
a first gasket on the upper surface; and
an interior portion including:
an annular body including a bottom surface, an annular inner surface, and a second thread on the annular inner surface, the annular body defining a central opening; and
a second gasket on the bottom surface,
in an assembled configuration, the cylindrical portion extending through the central opening, the first plurality of threads engaging the second thread to couple the exterior portion to the interior portion, the first gasket engaging an exterior surface of the panel to form a first watertight seal, and the second gasket engaging an interior surface of the panel to form a second watertight seal.

18. A method of assembling a light assembly to a panel, the method comprising:
positioning a first light portion at least partially within a through hole of a panel such that a first seal of the first light portion engages a first side of the panel;
axially aligning a second light portion with the first light portion such that the first light portion extends through a central opening of the second light portion; and
coupling the first light portion to the second light portion such that a second seal of the second light portion engages a second side of the panel opposite the first side of the panel.

19. The method of claim 18, wherein the coupling includes rotating the second light portion with respect to the first light portion to engage a first thread of the first light portion with a second thread of the second light portion.

20. The method of claim 18, wherein the coupling forms a first watertight seal between the first light portion and the panel and a second watertight seal between the second light portion and the panel.

* * * * *